Aug. 24, 1926.
S. LIGOTZ
1,597,608
THERMOMETER AND GAUGE TUBE
Filed Nov. 23, 1923
Fig.1. Fig.3. Fig.5. Fig.7.
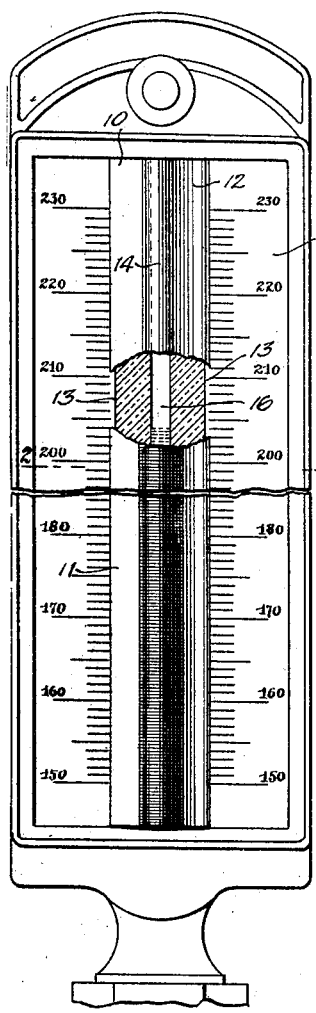
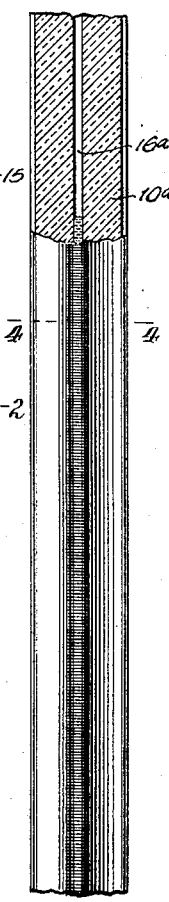
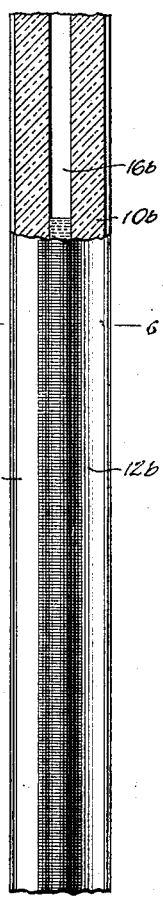
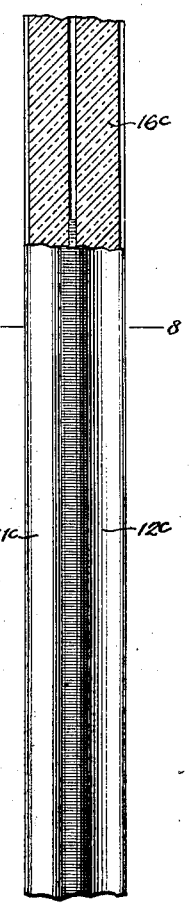
Fig.2. Fig.4. Fig.6. Fig.8.
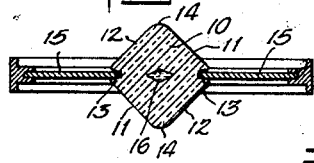
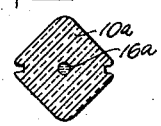
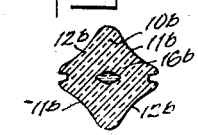
Fig.9. Fig.10. Fig.11. Fig.12.
WITNESSES
William P. Goebel
Hugh H. Ott
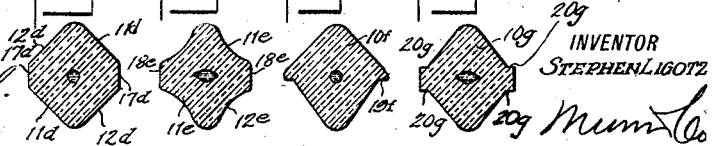
INVENTOR
Stephen Ligotz
ATTORNEYS Patented Aug. 24, 1926.

1,597,608

UNITED STATES PATENT OFFICE.

STEPHEN LIGOTZ, OF NEW YORK, N. Y.

THERMOMETER AND GAUGE TUBE.

Application filed November 23, 1923. Serial No. 676,604.

This invention has relation to measuring instruments and has particular reference to thermometer or gauge tubes.

As an object the present invention contemplates a thermometer or gauge tube which effects the magnification of the column of fluid within the same when viewed from opposite sides thereof, whereby the reading of the same is facilitated from both sides of the instrument of which it forms a part.

Furthermore the invention comprehends a thermometer or gauge tube which is formed with diametrically disposed means adapted for engagement with separated scaled dial sections between the confronting edges of which the tube is arranged.

As a still further object the invention contemplates an improvement in the cross sectional shape of thermometer tubes and the bores of the same, which coact to increase or augment the magnification of the fluid column.

As a still further object the invention aims to provide a thermometer or gauge tube, the cross sectional shape of the bore and exterior of which combine to minimize visual separation of the magnified fluid column when the tube is viewed at an angle.

The invention furthermore contemplates an improvement in thermometer or gauge tubes which does not materially increase the cost of production and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claim is expressed.

In the drawings—

Figure 1 is a front view of a gauge or other similar instrument equipped with a tube constructed in accordance with the invention, the tube being partially broken away and shown in section.

Fig. 2 is a cross sectional view taken approximately on the line 2—2 of Fig. 1.

Fig. 3 is a face view of a modified form of tube with a part thereof shown in section.

Fig. 4 is a sectional view therethrough taken on the line 4—4 of Fig. 3.

Fig. 5 is a face view of a further modification, illustrating the tube partly in section.

Fig. 6 is a transverse sectional view therethrough taken approximately on the line 6—6 of Fig. 5.

Fig. 7 is a face view of a still further modification with a part of the tube shown in section.

Fig. 8 is a transverse sectional view therethrough taken approximately on the line 8—8 of Fig. 7.

Figs. 9, 10, 11 and 12 are cross sectional views of further modified forms of the invention.

Referring to the drawings by characters of reference the tubes 10 are provided with two pairs of opposing faces 11 and 12, the faces of said opposing pairs being disposed at an angle to each other. As specifically illustrated in Figs. 1 to 8 inclusive, the opposite corners constituting the sides of the tube are grooved as at 13, while the front and rear corners 14 are rounded. The grooved sides 13 are adapted to receive the confronting inner edges of the scaled dial sections 15 of the instrument with which the tube is associated. As specifically illustrated in Figs. 1 and 2, the bore 16 is of a non-circular shape with the major axis in alignment with the grooved sides. By constructing a thermometer or gauge tube in this manner the magnification of the column of fluid within the tube is effected from both faces. It will also be observed that a more accurate gauging or reading of the column in connection with the scaled dial sections may be obtained while the tube constitutes a substantially transparent medium for the passage of light through the instrument. Furthermore by providing a non-circular bore 16 having its major axis transverse to the faces of the tube a wider column is presented to view which when magnified still further augments the visual width of the column. In Figs. 3 and 4 the tube $10^a$ is of substantially the same construction as that illustrated in Figs. 1 and 2 with the exception that in this instance the bore $16^a$ is circular. In Figs. 5 and 6 the faces $11^b$ and $12^b$ of the tube $10^b$ are concaved, which combined with the non-circular bore $16^b$ having its major axis transverse to the reading faces minimizes the visual separation of the magnified column due to the viewing of the tube from a point at an angle to the reading faces. This apparent separation or subdivision of the column is a common one occurring whenever two prisms are placed between the observer and the object observed in such a manner that the image of the object appears on both prisms. In the present case the visual separation occurs when viewing the mercury column from an angle at which the column is seen directly through one of the concave faces and simultaneously a reflected image is seen through the convex face. The convexity of the faces $11^c$ and $12^c$, as illustrated in Figs. 7 and 8, functions in a similar manner with a round bore $16^c$.

In the modified adaptation illustrated in Fig. 9 the pairs of opposed faces $11^d$ and $12^d$ are formed with flattened faces $17^d$ at their point of juncture constituting the sides of the tube to allow for abutting engagement of the faces $17^d$ with the confronting inner edges of a pair of separated dial sections.

In Figs. 10 similar flattened side faces $18^e$ are illustrated as combined with a tube having concaved pairs of confronting faces $11^e$ and $12^e$.

In Fig. 11 the tube $10^f$ is illustrated as provided with a single shoulder $19^f$ on each side edge for engagement with the separated dial faces of the instrument.

In the modified form illustrated in Fig. 12 the thermometer tube $10^g$ is illustrated as provided with a double shoulder $20^g$ at each side edge to engage with the double separated dial sections of an instrument of which the tube forms a part.

I claim:

A glass tube for gauges, thermometers or the like, comprising a length of material having two pairs of opposing concaved faces, the faces of said pairs being at an angle to each other whereby the column of fluid within the bore of the tube is magnified and whereby the visual separation of the columns is minimized when the tube is viewed at an angle.

STEPHEN LIGOTZ.